United States Patent
Bradley

(10) Patent No.: US 11,099,337 B2
(45) Date of Patent: Aug. 24, 2021

(54) MULTI-FIBER CONNECTORIZATION FOR OPTICAL FIBER CABLE ASSEMBLIES CONTAINING ROLLABLE OPTICAL FIBER RIBBONS

(71) Applicant: OFS Fitel, LLC, Norcross, GA (US)

(72) Inventor: Kelvin B Bradley, Lawrenceville, GA (US)

(73) Assignee: OFS FITEL, LLC, Norcross, GA (US)

( * ) Notice: Subject to any disclaimer, the term of this patent is extended or adjusted under 35 U.S.C. 154(b) by 229 days.

(21) Appl. No.: 16/285,323

(22) Filed: Feb. 26, 2019

(65) Prior Publication Data

US 2020/0103604 A1 Apr. 2, 2020

Related U.S. Application Data

(60) Provisional application No. 62/758,763, filed on Nov. 12, 2018, provisional application No. 62/739,370, filed on Oct. 1, 2018.

(51) Int. Cl.
G02B 6/38 (2006.01)
G02B 6/44 (2006.01)
G02B 6/40 (2006.01)

(52) U.S. Cl.
CPC ........... *G02B 6/406* (2013.01); *G02B 6/3839* (2013.01); *G02B 6/3853* (2013.01); *G02B 6/3861* (2013.01); *G02B 6/448* (2013.01); *G02B 6/3863* (2013.01)

(58) Field of Classification Search
CPC .... G02B 6/406; G02B 6/3839; G02B 6/3863; G02B 6/3861; G02B 6/3853
See application file for complete search history.

(56) References Cited

U.S. PATENT DOCUMENTS

| | | | |
|---|---|---|---|
| 10,678,012 B1* | 6/2020 | Wu | G02B 6/447 |
| 2005/0018993 A1* | 1/2005 | Rolston | G02B 6/4249 385/137 |
| 2017/0031121 A1* | 2/2017 | Blazer | G02B 6/4434 |
| 2017/0052321 A1* | 2/2017 | Bushnell | G02B 6/32 |

* cited by examiner

*Primary Examiner* — Sung H Pak
*Assistant Examiner* — Hoang Q Tran
(74) *Attorney, Agent, or Firm* — Smith Tempel Blaha LLC; John Harmon, Esq.

(57) ABSTRACT

Embodiments of the invention include a connectorized optical fiber cable. The connectorized optical fiber cable includes at least one multi-fiber unit tube and at least one rollable optical fiber ribbon comprising a plurality of optical fibers positioned within the multi-fiber unit tube. The plurality of optical fibers are rollable in such a way that a first portion of the at least one rollable optical fiber ribbon inside of the at least one multi-fiber unit tube is formed in a substantially circular shape and a second portion of the at least one rollable optical fiber ribbon extending from an end of the at least one multi-fiber unit tube is formed in a substantially flat shape. The connectorized optical fiber cable also includes a jacket surrounding the multi-fiber unit tube and a multi-fiber ferrule connected to an end of the second portion of the at least one rollable optical fiber ribbon.

9 Claims, 10 Drawing Sheets

MULTI-FIBER CONNECTORIZATION FOR OPTICAL FIBER CABLE ASSEMBLIES CONTAINING ROLLABLE OPTICAL FIBER RIBBONS

STATEMENT REGARDING RELATED APPLICATIONS

This patent application claims priority under 35 U.S.C. § 119(e) to U.S. Provisional Patent Application Ser. No. 62/739,370, filed on Oct. 1, 2018, entitled, "Connectorized Multi-fiber Fiber Optic Cable Assemblies Containing Rollable Ribbons" and U.S. Provisional Patent Application Ser. No. 62/758,763, filed on Nov. 12, 2018, entitled, "Connectorized Multi-fiber Fiber Optic Cable Assemblies Containing Rollable Ribbons and Lensed Connectors," the entire contents of which are hereby incorporated by reference.

BACKGROUND OF THE INVENTION

Field of Invention

The invention relates to optical fiber cables. More particularly, the invention relates to connectorization for optical fiber cable assemblies containing optical fiber ribbons.

Description of Related Art

An optical fiber ribbon comprises two or more parallel optical fibers that are joined together along their lengths. A material commonly referred to as a matrix adheres the fibers together. In a "flat" or "encapsulated" optical fiber ribbon, the parallel optical fibers may be fully encapsulated within the matrix material. The rigidity of flat optical fiber ribbons presents challenges to achieving high fiber packing density in optical fiber cables. Optical fiber ribbons, including flat optical fiber ribbons, become problematic when cabled into relatively high fiber counts. Conventional flat optical fiber ribbons often are grouped into rectangular arrays, referred to as stacks, when assembling an optical fiber cable. However, optical fiber cables usually need to be circular to be easily installed. Therefore, the rectangular ribbon stack must fit into the round circular cable structure. Accordingly, such conventional configurations lead to empty space in the optical fiber cable structure.

To address this issue, some cable manufacturers have developed partially-bonded optical fiber ribbons, also referred to as rollable ribbons, where the optical fibers forming the optical fiber ribbon are not bonded over their entire length.

FIG. 1 is a perspective view of a conventional 4-fiber partially bonded optical fiber ribbon 30, e.g., a partially bonded optical fiber ribbon suitable for use as a rollable ribbon. The optical fiber ribbon 30 includes a plurality of optical fibers 32 linearly arranged as a ribbon, with each optical fiber 32 having a fiber portion 34 and a coating portion 36. In optical fiber ribbon 30, portions of the periphery of the optical fibers 32 are intermittently covered with a ribbon matrix portion 38. As shown, the ribbon matrix portions 38 are uniformly displaced along various portions of the periphery of the optical fibers 32 between adjacent optical fibers 32.

FIG. 2 is a top view of a conventional 8-fiber partially bonded optical fiber ribbon 40, e.g., a partially bonded optical fiber ribbon suitable for use as a rollable ribbon. The optical fiber ribbon 40 includes a plurality of optical fibers 42 linearly arranged as a ribbon, with each optical fiber 42 having a fiber portion and a coating portion around the fiber portion. The optical fiber ribbon 40 also includes a plurality of ribbon matrix portions 44, which are applied in a suitable manner to various portions between adjacent optical fibers 42. As shown, the ribbon matrix portions 44 can be applied in a staggered, uniform pattern across the optical fibers 42, however, the ribbon matrix portions 44 are applied to the optical fibers 42 in such a manner that adjacent optical fibers 42 remain connected to one another, thus remaining an optical fiber ribbon, but also in a manner that allows the optical fiber ribbon 40 to be rolled and/or folded into one of a plurality of more densely configured unit shapes.

As shown in FIGS. 1 and 2, the optical fibers in optical fiber ribbons 30, 40 are bonded intermittently, thus allowing the optical fiber ribbons 30, 40 to be folded or rolled into an approximately cylindrical shape, as shown in FIG. 3.

FIG. 3 is a perspective view of a rollable ribbon 50, after being rolled. As shown, the optical fibers 52A-D are rolled and/or folded into a more densely configured unit shape, e.g., in a generally circular shape, as shown. As discussed hereinabove, because of the specific structure of the rollable optical fiber ribbon 50, e.g., being a partially bonded optical fiber ribbon or an optical fiber ribbon having other suitable structure, the rollable optical fiber ribbon 50 is able to be rolled and/or folded into a more densely configured unit shape.

The ability of the optical fibers in a rollable ribbon to be rolled and/or folded into a more densely configured unit shape, e.g., in a generally circular shape, allows better packing of the optical fiber ribbon(s) within a circular optical fiber cable, resulting in more optical fibers being accommodated by a given cable diameter, compared to optical fiber cables with conventional fully-bonded ribbon stack structures.

An optical fiber ribbon can be produced by applying dots or matrix material in a pattern before curing. As discussed hereinabove, an optical fiber ribbon includes a plurality of optical fibers, with each optical fiber having a fiber portion and an acrylate coating. The fiber cladding or glass fiber diameter typically is 125 microns ($\mu$m), but other sizes (i.e., 80 $\mu$m, 100 $\mu$m, 140 $\mu$m, etc.) are feasible. The acrylate coating typically has an outside diameter of approximately 200 $\mu$m or 250 $\mu$m, nominally, depending on fiber-density requirements. It should be understood that the rollable ribbon can be comprised of any suitable number of optical fibers, e.g., 4, 6, 8, 12, 16, or 24 optical fibers, and that the optical fibers typically are organized by color, per industry standards.

In data centers, central offices and other structured-cabling applications, fiber-optic patch panels are being widely deployed to facilitate connections between switches, servers, and storage devices. For example, data centers continue to be required for mass storage, and necessitate the ability to retrieve stored information on demand. The associated equipment often is installed within cabinets in standard-sized equipment racks. Each piece of equipment typically provides one or more adapters to which optical or electrical patch cables can be physically connected. These cable assemblies are generally routed to other network equipment located in the same cabinet or in another cabinet. As such, a common problem is space management.

In many cases, an equipment rack interconnects with 288 separate optical fibers, where the number is based on the availability of 12-count optical fiber ribbons, and thus requires 24 separate ribbons to accommodate the rack. To address this need, high-fiber-count cable assemblies, comprised of sub-units containing the total number of individual optical fibers required to populate a given equipment rack (e.g., 288 optical fibers), must be provided in a cost-effective and space-optimized cable configuration, terminated with multi-fiber connectors. While bundles of loose fibers can be used to increase optical fiber densities in optical fiber cables, the need to organize the optical fibers (by color) prior to splicing and connectorization makes using loose fibers, for high-density applications, undesirable from a time-savings and cost perspective.

SUMMARY OF THE INVENTION

The invention is embodied in a connectorized optical fiber cable. The connectorized optical fiber cable includes at least one multi-fiber unit tube. The multi-fiber unit tube is substantially circular and dimensioned to receive a plurality of optical fibers. The connectorized optical fiber cable also includes at least one rollable optical fiber ribbon comprising a plurality of optical fibers positioned within the at least one multi-fiber unit tube. The plurality of optical fibers in the at least one rollable optical fiber ribbon are rollable in such a way that a first portion of the at least one rollable optical fiber ribbon inside of the at least one multi-fiber unit tube is formed in a substantially circular shape and a second portion of the at least one rollable optical fiber ribbon extending from an end of the at least one multi-fiber unit tube is formed in a substantially flat shape. The connectorized optical fiber cable also includes a jacket surrounding the at least one multi-fiber unit tube. The connectorized optical fiber cable also includes a multi-fiber ferrule connected to an end of the second portion of the at least one rollable optical fiber ribbon.

DETAILED DESCRIPTION OF EXEMPLARY EMBODIMENTS

Figure 1:
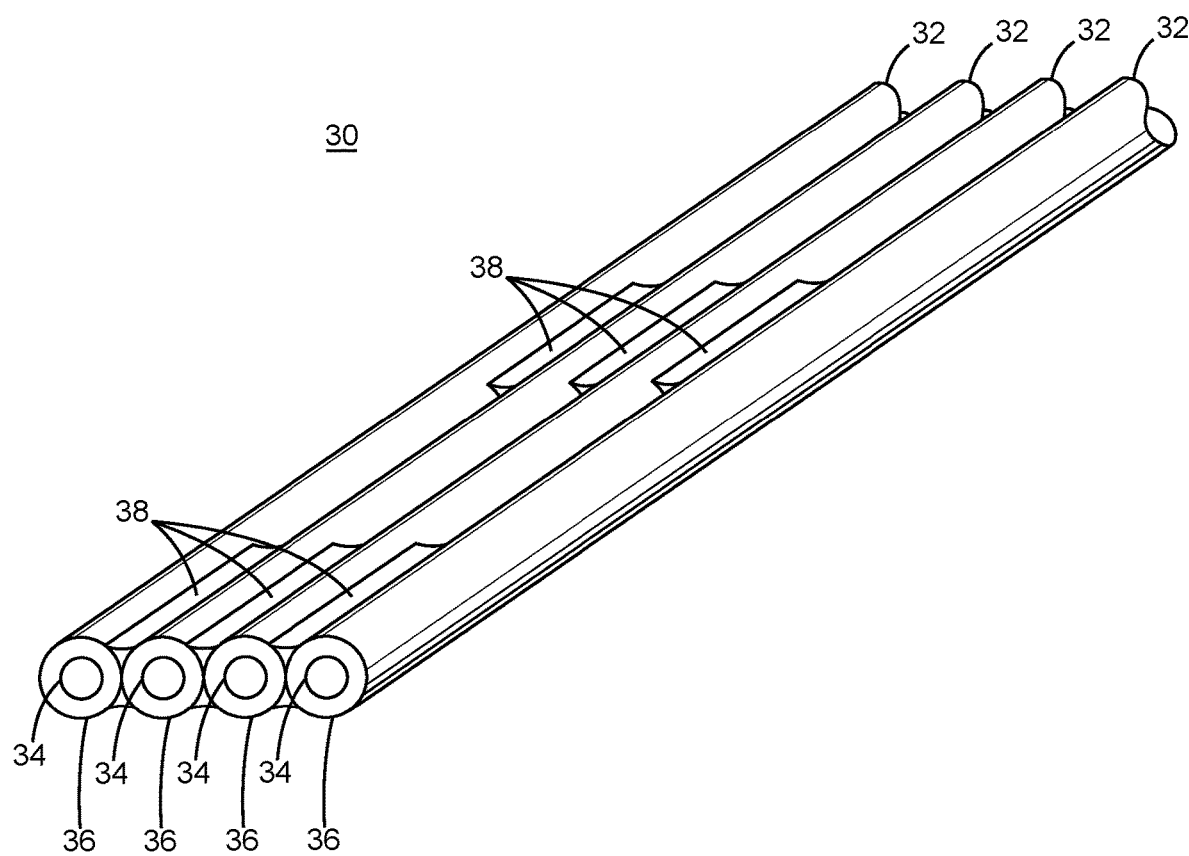
FIG. 1 is a perspective view of a conventional partially bonded optical fiber ribbon.
Figure 2:
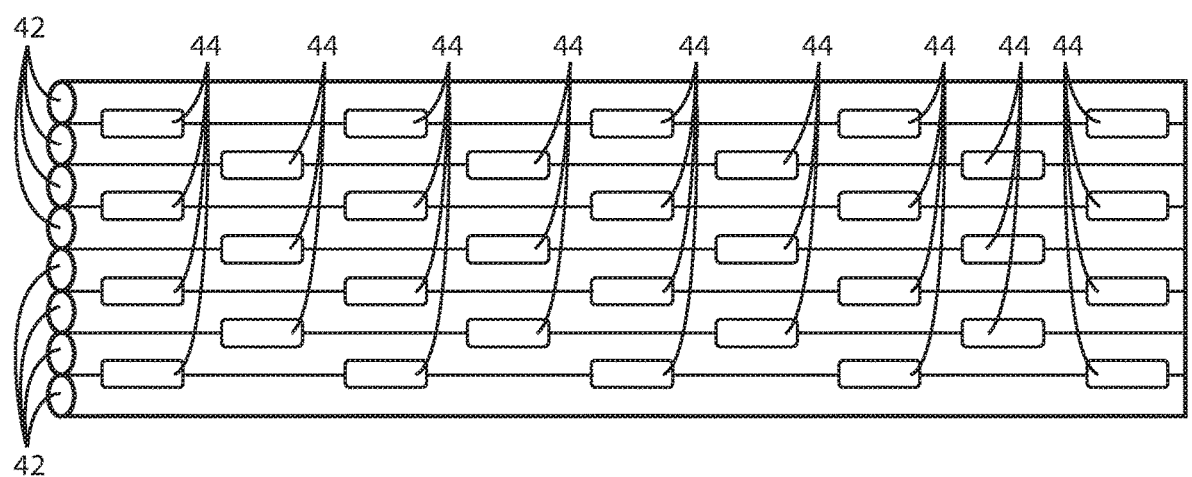
FIG. 2 is a top view of another conventional partially bonded optical fiber ribbon.
Figure 3:
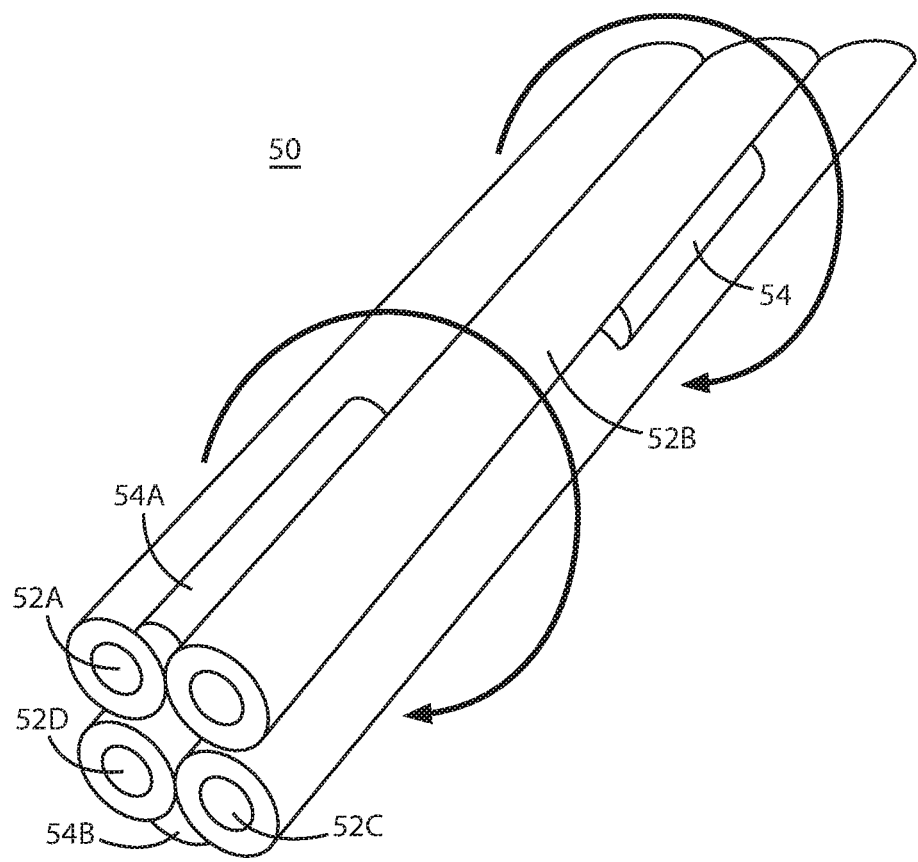
FIG. 3 is a perspective view of a conventional partially bonded optical fiber ribbon, after being rolled.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Embodiments of the invention include a connectorized optical fiber cable assembly terminated with a multi-fiber ferrule. The connectorized optical fiber cable assembly includes one or more multi-fiber unit tubes. The multi-fiber unit tubes are circular and dimensioned to receive a plurality of optical fibers. The connectorized optical fiber cable assembly also includes one or more rollable optical fiber ribbons positioned within at least one of the multi-fiber unit tubes. The rollable ribbons are partially bonded in such a way that the rollable ribbons can be randomly positioned within the multi-fiber unit tube, e.g., in a generally circular shape or arrangement. The connectorized optical fiber cable assembly also can include a jacket surrounding the plurality of multi-fiber unit tubes. The connectorized optical fiber cable assembly is also configured such that at least one of the rollable ribbons is terminated with a multi-fiber ferrule.

Conventionally, rollable optical fiber ribbons (including partially bonded rollable optical fiber ribbons), whether employed within an optical fiber cable assembly or not, are connected or otherwise terminated by fusion splicing. In one conventional arrangement, the individual optical fibers in the rollable ribbon are fusion spliced to other individual optical fibers. In another conventional arrangement, the optical fibers in the rollable ribbon are mass fusion spliced to other optical fibers. Mass fusion splicing involves the fusing of multiple optical fibers at a time, as opposed to fusing just one optical fiber at a time.

As discussed hereinabove, when housing rollable optical fiber ribbons into a multi-fiber unit tube structure, the rollable optical fiber ribbons can be forced into roughly cylindrical shapes (and other suitable shapes). However, when rollable optical fiber ribbons are made, and when rollable optical fiber ribbons are taken out of their multi-fiber unit tube structure, each rollable optical fiber ribbon wants to lay flat, with the matrix material holding the individual optical fibers in sequential order. With the rollable optical fiber ribbon lying flat, the rollable optical fiber ribbon can be directly fusion spliced using the same conventional methods used for fusion splicing conventional flat optical fiber ribbons.

According to embodiments of the invention, rollable optical fiber ribbons (including partially bonded rollable optical fiber ribbons), whether employed within an optical fiber cable assembly or not, are terminated with a multi-fiber ferrule. As will be discussed in greater detail hereinbelow, the end portion of a rollable ribbon containing a plurality of partially bonded optical fibers is stripped to expose the bare ends of the optical fibers, the exposed ends of the optical fibers are inserted into a corresponding plurality of guide holes of a multi-fiber ferrule, the optical fibers are bonded within the multi-fiber ferrule, the ends of the optical fibers are trimmed to create a plurality of optical fiber endfaces protruding from the endface of the multi-fiber ferrule, and the protruding optical fiber endfaces are polished approximately flush with the endface of the multi-fiber ferrule.

Figure 4:
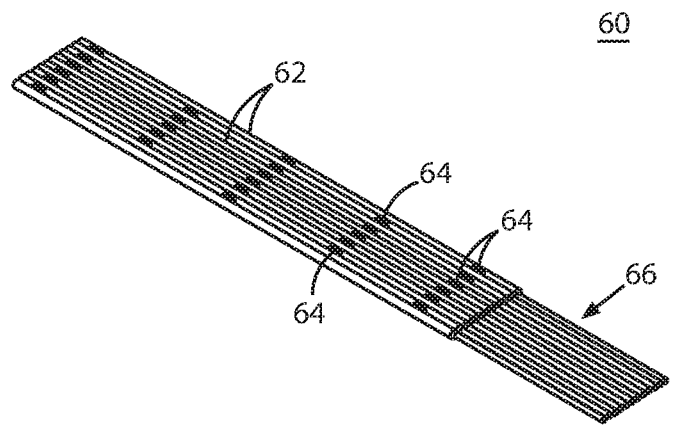
FIG. 4 is a perspective view of a partially bonded optical fiber ribbon that has been stripped to expose the bare ends of the optical fibers.

FIG. 4 is a perspective view of a partially bonded optical fiber ribbon 60 that has been stripped to expose the bare ends of the optical fibers. As shown, the partially bonded optical fiber ribbon 60 includes a plurality of (coated) optical fibers 62 (e.g., 12 optical fibers) that are adhered together as a rollable ribbon by a plurality of matrix portions 64 applied to various locations between adjacent optical fibers 62. The optical fibers 62 typically have a 250 µm pitch between the centers of adjacent optical fibers 62, although the optical fibers 62 can have a different pitch, depending on the thickness of the coating on each optical fiber 62. The ends 66 of the plurality of optical fibers 62 have been stripped of their coating, thus exposing the bare ends of the optical fibers 62.

Figure 5:
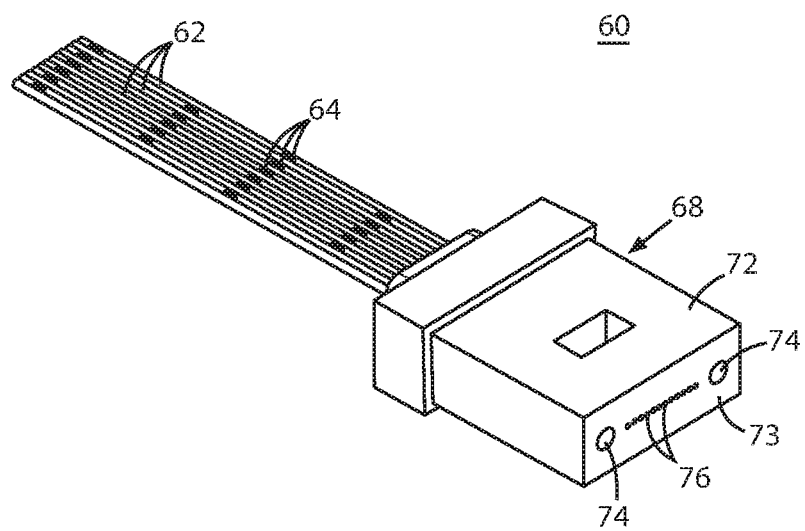
FIG. 5 is a perspective view of the partially bonded optical fiber ribbon of FIG. 4 after being terminated into a multi-fiber ferrule, according to embodiments of the invention.

FIG. 5 is a perspective view of the partially bonded optical fiber ribbon 60 of FIG. 4 after being terminated into a multi-fiber ferrule 68, according to embodiments of the invention. The multi-fiber ferrule 68, which can be an MT connector ferrule, or other suitable ferrule, includes a connector body 72, an endface 73 and a plurality of connector alignment holes 74. The multi-fiber ferrule 68 also includes a plurality of optical fiber guide holes 76 that correspond to the plurality of optical fibers in the partially bonded optical fiber ribbon 60.

Unlike bundles of loose coated optical fibers, rollable ribbons do not require fiber separation, organization by color, or manual ribbonization, using ribbonizing tapes or adhesives. Therefore, terminating rollable ribbons with multi-fiber ferrules is easier and more cost effective than terminating bundles of loose coated optical fibers. According to embodiments of the invention, optical fiber rollable ribbons that are terminated with a multi-fiber ferrule can then be used to make connections between multi-channel laser sources and photodetector arrays.

Figure 6:
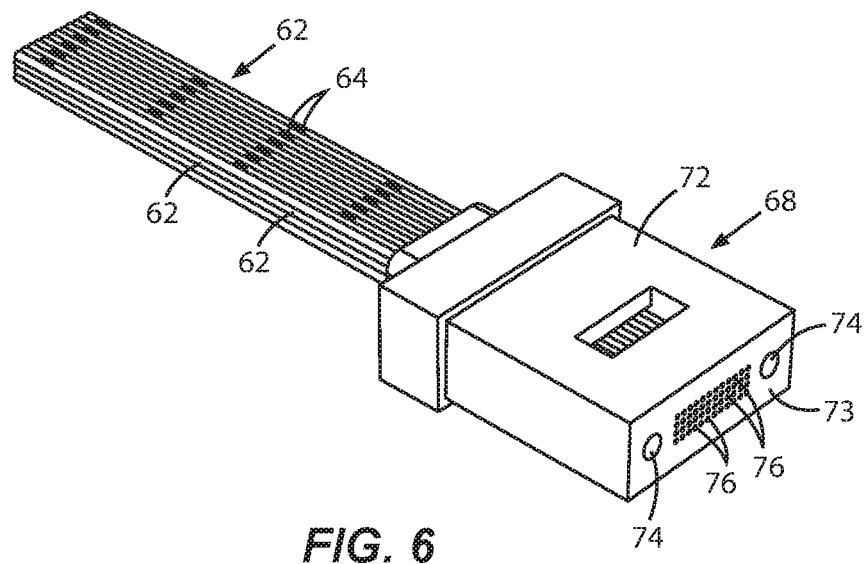
FIG. 6 is a perspective view of an array of partially bonded optical fiber ribbons terminated into a 2D-array multi-fiber ferrule, according to embodiments of the invention.

It should be understood that the number of optical fibers 62 accommodated by the multi-fiber ferrule 68 may vary. Optical fiber rollable ribbons having 4, 6, 8, 12, 16 and 24 optical fibers are feasible, and can be produced using rollable-ribbon technology. Multi-fiber ferrules 68, including MT connector ferrules, are available in numerous sizes with various guide hole counts, as well, to address a wide range of connector and signal routing applications. For example, the MT4, MT8, MT12, and MT16 connector ferrules are used in one-dimensional (1D) array MPO terminations. For even higher densities, optical fibers can be terminated into 2D-array MT16, MT24, MT48, MT60, or MT72 connector ferrules, as shown in FIG. 6. As such, it should also be understood that by installing the appropriate cable transitions, furcation tubing, connector strain-relief boots, connector housings, springs, etc., the terminated ends of optical fibers in optical fiber rollable ribbons can be configured as MPO connectors, for use in patch panel, plug-n-play or backplane applications.

Figure 7:
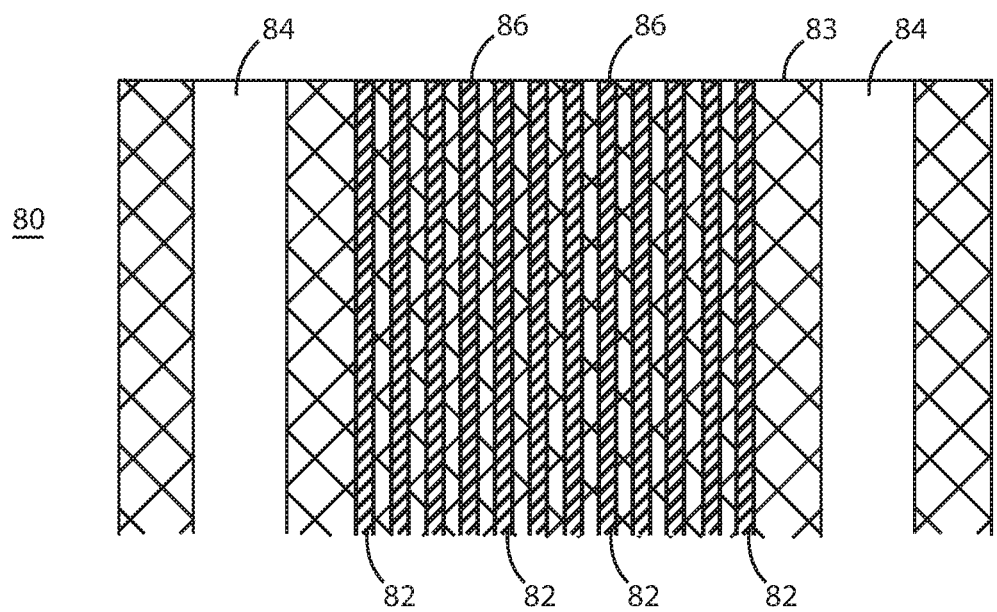
FIG. 7 is a cross-sectional view of the front section of a multi-fiber ferrule.

FIG. 7 is a cross-sectional view of the front section of a multi-fiber ferrule 80, through a plane passing through the longitudinal axes of the fibers. The multi-fiber ferrule 80 includes a plurality of guide holes that are dimensioned to closely receive a corresponding plurality of optical fibers 82. The guide holes are arranged side-to-side in a linear array, extend through the ferrule and terminate at the ferrule endface 83.

At the end of the mounting process for the multi-fiber ferrule 80, each optical fiber 82 is firmly held in position within its respective guide hole by epoxy, or other suitable material. The multi-fiber ferrule 80 also includes a pair of connector alignment holes 84. The connector alignment holes 84 are configured to receive respective alignment pins (not shown) to help align the multi-fiber ferrule 80 as the multi-fiber ferrule 80 is seated into a mating structure or mated to an opposing multi-fiber ferrule. For reliable connections between optical fibers, the corresponding cores of the connecting optical fibers in each multi-fiber ferrule/connector must be in contact and under pressure when the two multi-fiber ferrules/connectors are mated.

When connector ferrules are polished, the endfaces 86 of the optical fibers are convex. Thus, fiber-to-fiber contact pressure is required to deform (i.e., flatten) the convex endfaces 86 enough to allow the cores of the optical fibers to fully meet. Fiber-to-fiber contact between multi-fiber connectors is achieved by polishing the multi-fiber ferrules so that the optical fibers protrude several micrometers above the surface of the ferrule, as shown. After assembly, each optical fiber typically protrudes from the endface 83 of the multi-fiber ferrule 80 a distance ranging from 1 µm to 10 µm. However, for better reliability, the preferred range of optical fiber protrusion is 1 µm to 3.5 µm, which can be achieved via proper selection of polishing methods and consumables.

According to alternative embodiments of the invention, rollable optical fiber ribbons (including partially bonded rollable optical fiber ribbons), whether employed within an optical fiber cable assembly or not, are terminated with a lensed multi-fiber ferrule. As will be discussed in greater detail hereinbelow, the end portion of a rollable ribbon containing a plurality of partially bonded optical fibers is stripped to expose the bare ends of the optical fibers, the exposed ends of the optical fibers are cleaved using a laser, the laser-cleaved ends of the optical fibers are inserted into the lensed multi-fiber ferrule and pushed forward until they contact a fiber stop plane within the lensed multi-fiber ferrule, and the optical fibers are bonded within the lensed multi-fiber ferrule using an epoxy or other suitable bonding material.

Figure 8:
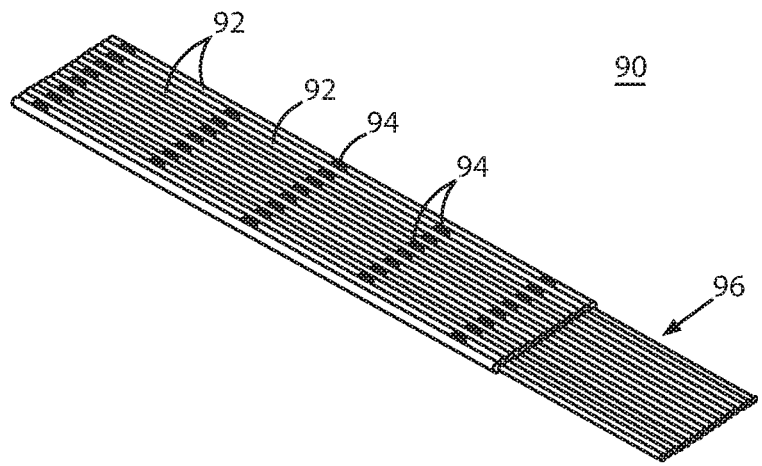
FIG. 8 is a perspective of a partially bonded optical fiber ribbon that has been stripped to expose the bare ends of the optical fibers.

FIG. 8 is a perspective view of a partially bonded optical fiber ribbon 90 that has been stripped to expose the bare ends of the optical fibers. As shown, the partially bonded optical fiber ribbon 90 includes a plurality of (coated) optical fibers 92 (e.g., 16 optical fibers) that are adhered together as a rollable ribbon by a plurality of matrix portions 94 applied to various locations between adjacent optical fibers 92. The optical fibers 92 typically have a 250 µm pitch between the centers of adjacent optical fibers 92, although the optical fibers 92 can have a different pitch, depending on the thickness of the coating on each optical fiber 92. The ends 96 of the plurality of optical fibers 92 have been stripped of their coating, thus exposing the bare ends of the optical fibers 92.

Figure 9:
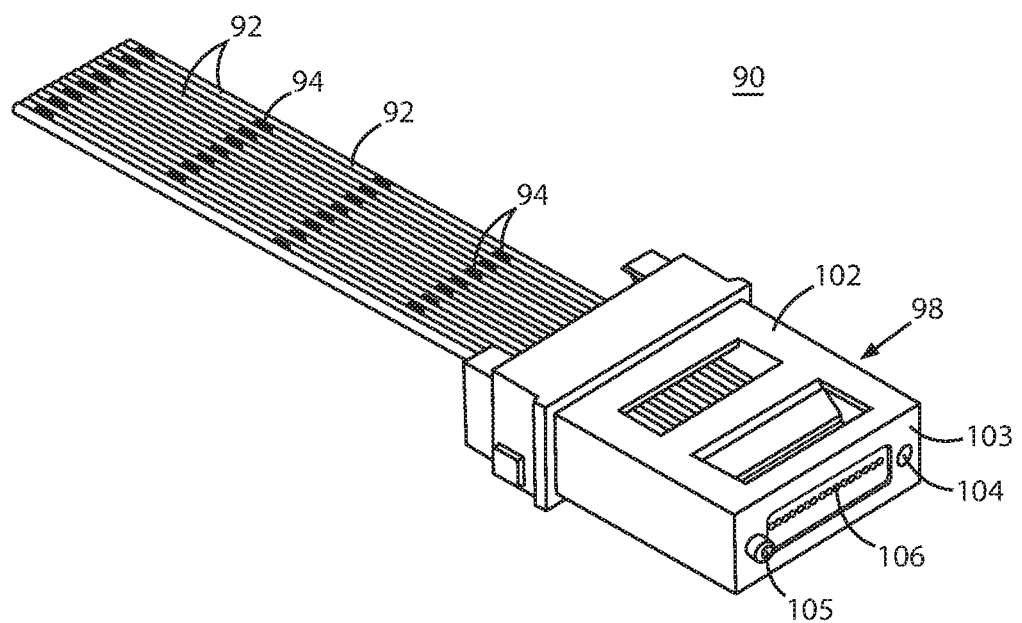
FIG. 9 is a perspective view of the partially bonded optical fiber ribbon of FIG. 8 after being terminated into a lensed multi-fiber ferrule, according to embodiments of the invention.

FIG. 9 is a perspective view of the partially bonded optical fiber ribbon 90 of FIG. 8 after being terminated into a lensed multi-fiber ferrule 98, according to embodiments of the invention. The lensed multi-fiber ferrule 98, which can be an MT connector ferrule, or other suitable lensed ferrule, includes a connector body 102, an endface 103, a connector alignment hole 104 and a connector post 105. The lensed multi-fiber ferrule 98 also includes a recessed row of lenses 106 that correspond to the plurality of optical fibers in the array of partially bonded optical fiber ribbon 90.

Unlike bundles of loose coated optical fibers, rollable ribbons do not require fiber separation, organization by color, or manual ribbonization, using ribbonizing tapes or adhesives. Therefore, terminating rollable ribbons with lensed multi-fiber ferrules is easier and more cost effective than terminating bundles of loose coated optical fibers. According to embodiments of the invention, optical fiber rollable ribbons that are terminated with a lensed multi-fiber ferrule can then be used to make connections between multi-channel laser sources and photodetector arrays.

Figure 10:
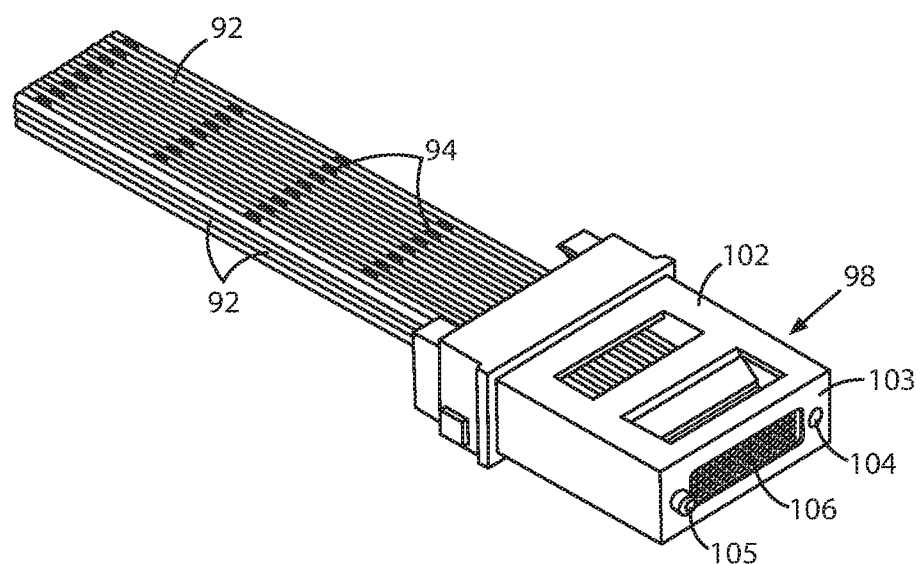
FIG. 10 is a perspective view of an array of partially bonded optical fiber ribbons terminated into a 2D-array lensed multi-fiber ferrule, according to embodiments of the invention.

It should be understood that the number of optical fibers 92 accommodated by the lensed multi-fiber ferrule 98 may vary. Optical fiber rollable ribbons having 4, 6, 8, 12, 16 and 24 optical fibers are feasible, and can be produced using rollable-ribbon technology. Lensed multi-fiber ferrules 98 are available in numerous sizes with various guide hole counts, as well, to address a wide range of connector and signal routing applications. For example, lensed multi-fiber ferrules that can accommodate up to 64 optical fibers are available, as shown in FIG. 10.

Lensed multi-fiber ferrules are available in a multi-fiber connector configuration known as the MXC Connector, which has a cantilever latch having its fixed end positioned toward the front of the connector housing. The MXC connector has been optimized for point-to-point, equipment card and blind-mate backplane applications. Lensed multi-fiber ferrule technology features lenses positioned in front of the optical fibers to collimate the transmitted light. This expanded-beam technology reduces the sensitivity of the connector to dust, since the area of the collimated beam is significantly larger than the area of the standard optical fiber core. As such, a potential dust particle blocks a smaller amount of the transmitted light. Also, the collimated light results in less sensitivity to z-axis misalignment of the ferrule.

Figure 11:
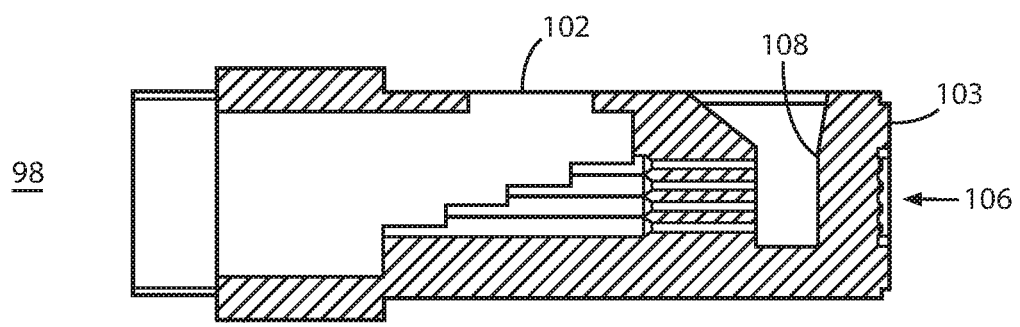
FIG. 11 is a cross-sectional view of the front section of a lensed multi-fiber ferrule.

The lensed multi-fiber ferrule is a monolithic, injection-molded, optically clear ferrule, which features an internal optical stop plane 108, as shown in FIG. 11, against which the stripped, laser-cleaved ends of the optical fibers are positioned. The lensed multi-fiber ferrule can accommodate up to 16 optical fibers per row, in four rows. The lensed multi-fiber ferrule is hermaphroditic, featuring a connector alignment hole 104 and a connector post 105, instead of using expensive stainless steel alignment pins. Also, the array of lenses 106 on the endface 103 are slightly recessed to reduce the likelihood of damage from contamination during mating, while allowing the lenses to be accessible for cleaning.

The external dimensions of the lensed multi-fiber ferrule are basically the same as the standard through-hole MT connector ferrule, so the lensed multi-fiber ferrule is compatible with MPO connector housing components. As such, it should also be understood that by installing the appropriate cable transitions, furcation tubing, connector strain-relief boots, connector housings, springs, etc., the terminated ends can be configured as MXC or MPO-adapter-compatible connectors, for use in patch panel, plug-n-play, or backplane applications.

According to an embodiment of the invention, multi-fiber ferrules, including lensed multi-fiber ferrules, are used to terminate the optical fibers of at least one rollable optical fiber ribbon contained within various optical fiber cable assemblies. For example, the optical fiber cable assembly can include a plurality of multi-fiber unit tubes containing one or more rollable optical fiber ribbons. The plurality of multi-fiber unit tubes can be positioned within the optical fiber cable assembly in any suitable manner, e.g., positioned around a central strength member in a single row or in multiple rows, and surrounded by an outer sheath or jacket. See US Patent Publication No. 2017/0235068 A1 and US Patent Publication No. 2018/0224619 A1.

Each multi-fiber unit tube structure can be made of any suitable material. For example, each multi-fiber unit tube structure can be made of polypropylene, polybutylene terephthalate (PBT), polyethylene, nylon, polycarbonate, thermoplastic polyurethane (TPU), poly(vinyl chloride) (PVC) or other suitable material or materials. Flame retardant additives may be incorporated into the multi-fiber unit tube structure to help impart fire resistance, which may be desirable if some or all of the cable is deployed inside a building. Also, one or more dry water swellable materials may be incorporated into the multi-fiber unit tube structure to block water penetration therein. The multi-fiber unit tube structure can be a homogeneous tube. Alternatively, the multi-fiber unit tube structure can be a multi-layer tube produced by coextrusion.

The outer sheath or jacket can be made of any suitable material. For example, the jacket can be made of polyethylene, thermoplastic polyurethane, nylon 12, or other suitable material. Flame-retardant additives may be incorporated into the jacket to impart fire resistance to the cable. In one embodiment, the jacket is made from high-density polyethylene (HDPE), with a nominal jacket thickness of approximately 0.5 mm or less. For microcable applications, it is desirable to use the thinnest possible jacket that can be fabricated without pinholes or other defects.

Figure 12:
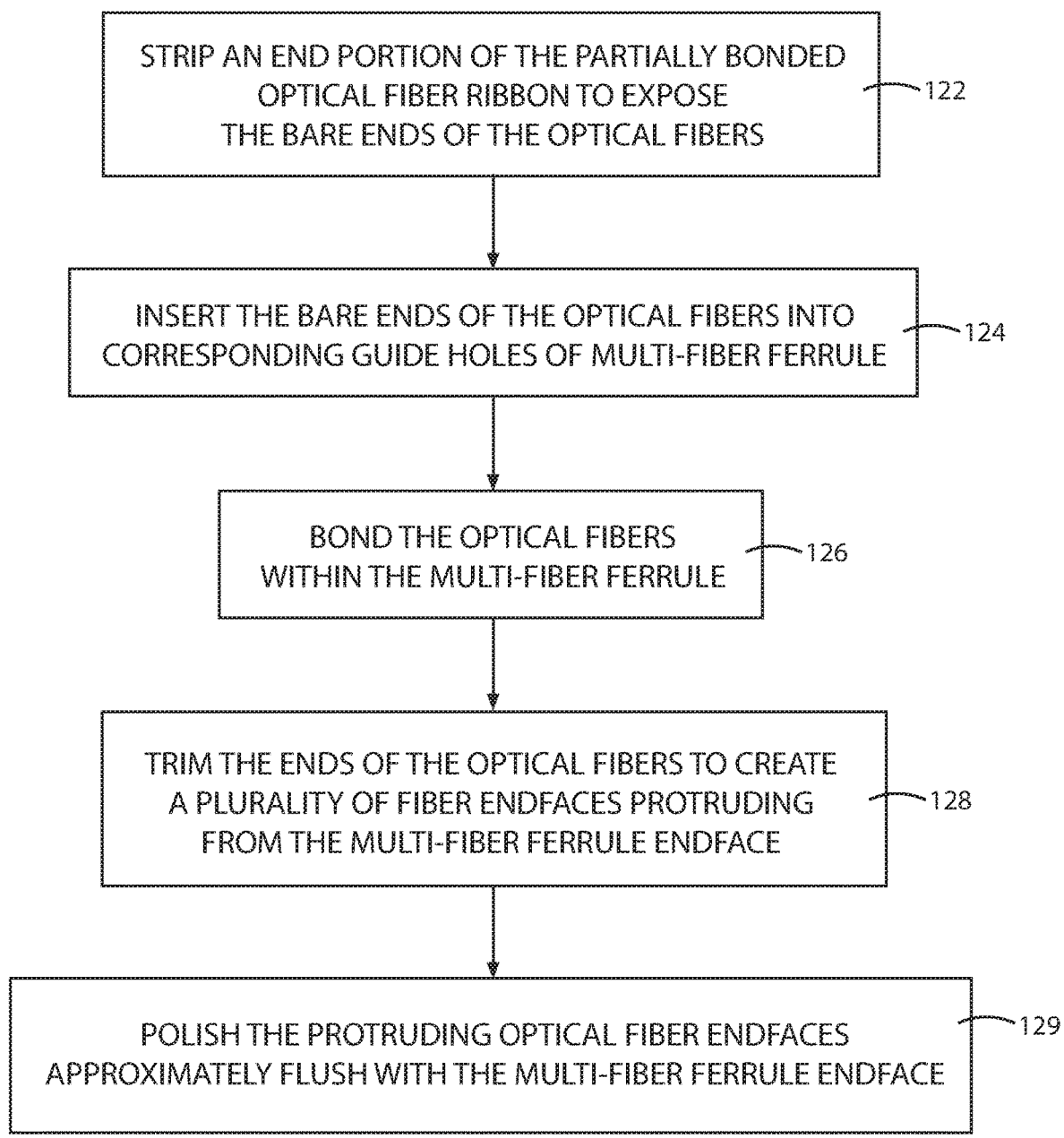
FIG. 12 is a flow diagram of a method for terminating a partially bonded optical fiber ribbon into a multi-fiber ferrule, according to embodiments of the invention.

FIG. 12 is a flow diagram of a method 120 for terminating a partially bonded optical fiber ribbon into a multi-fiber ferrule, according to embodiments of the invention. The method 120 includes a step 122 of stripping the end portion of a rollable ribbon containing a plurality of partially bonded optical fibers. Stripping the end portion of the rollable ribbon exposes the bare ends of the optical fibers.

The method 120 also includes a step 124 of inserting the exposed bare ends of the optical fibers into the multi-fiber ferrule. The exposed bare ends of the optical fibers are inserted into a corresponding plurality of guide holes within the multi-fiber ferrule.

The method 120 also includes a step 126 of bonding the optical fibers within the multi-fiber ferrule. The optical fibers are bonded within the multi-fiber ferrule using an epoxy or other suitable bonding material.

The method 120 also includes a step 128 of trimming the ends of the optical fibers. The ends of the optical fibers are trimmed in such a way as to create a plurality of optical fiber endfaces that protrude from the endface of the multi-fiber ferrule. The ends of the optical fibers are trimmed using any suitable trimming device.

The method 120 also includes a step 129 of polishing the protruding endfaces of the optical fibers. The protruding endfaces of the optical fibers are polished in such a way that the polished endfaces of the optical fibers are approximately flush with the endface of the multi-fiber ferrule.

Figure 13:
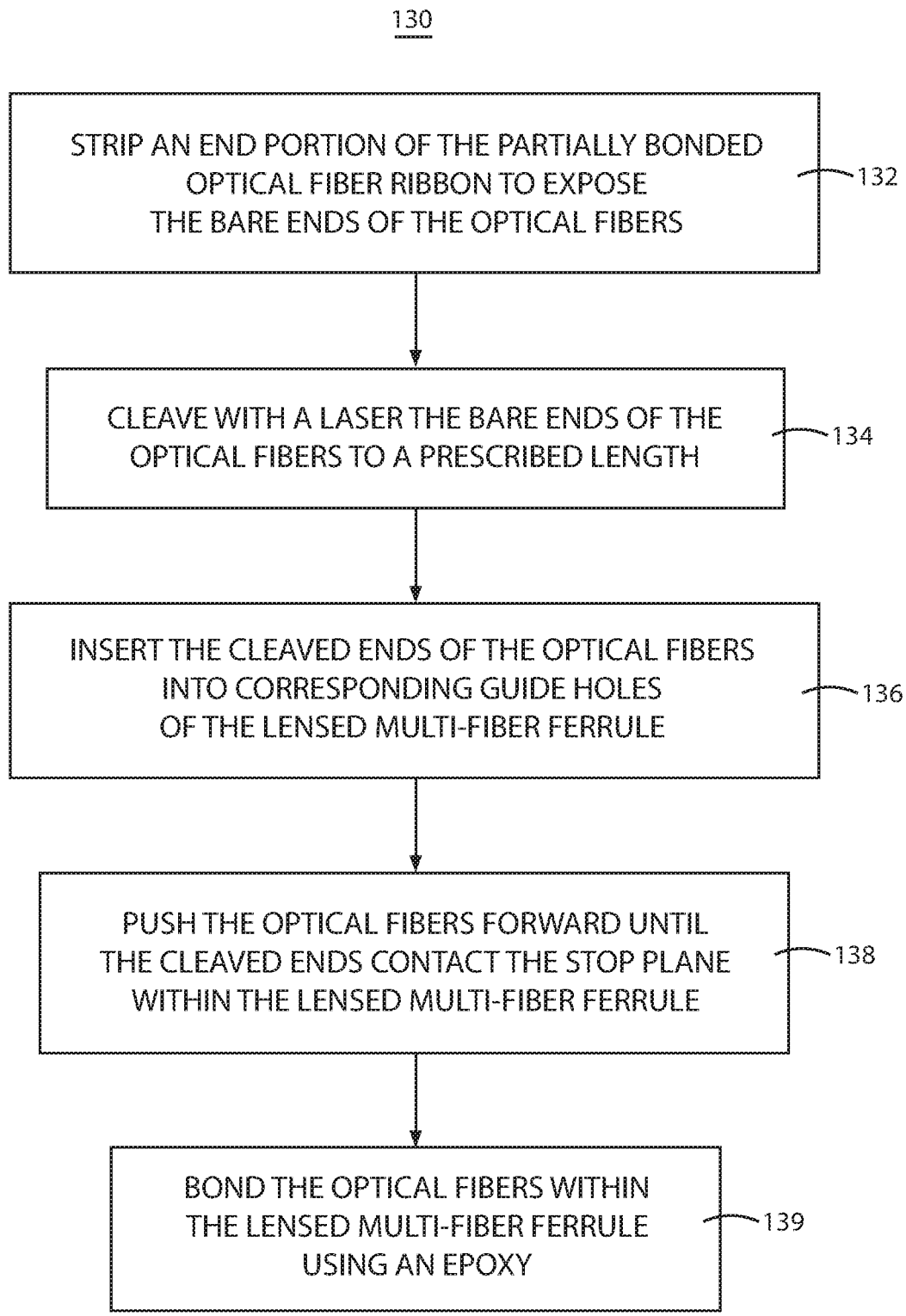
FIG. 13 is a flow diagram of a method for terminating a partially bonded optical fiber ribbon into a lensed multi-fiber ferrule, according to embodiments of the invention.

FIG. 13 is a flow diagram of a method for terminating a partially bonded optical fiber ribbon into a lensed multi-fiber ferrule, according to embodiments of the invention. The method 130 includes a step 132 of stripping the end portion of a rollable ribbon containing a plurality of partially bonded optical fibers. Stripping the end portion of the rollable ribbon exposes the bare ends of the optical fibers.

The method 130 also includes a step 134 of cleaving the exposed bare ends of the optical fibers. The exposed bare ends of the optical fibers are cleaved using a laser or other suitable cleaving device.

The method 130 also includes a step 136 of inserting the laser-cleaved ends of the optical fibers into the lensed multi-fiber ferrule. The laser-cleaved ends of the optical fibers are inserted into a corresponding plurality of guide holes defined longitudinally through the lensed multi-fiber ferrule.

The method 130 also includes a step 138 of pushing the optical fibers forward within the lensed multi-fiber ferrule until the laser-cleaved ends of the optical fibers contact the fiber stop plane within the lensed multi-fiber ferrule.

The method 130 also includes a step 139 of bonding the optical fibers within the lensed multi-fiber ferrule. The optical fibers are bonded within the lensed multi-fiber ferrule using an epoxy or other suitable bonding material.

Figure 14:
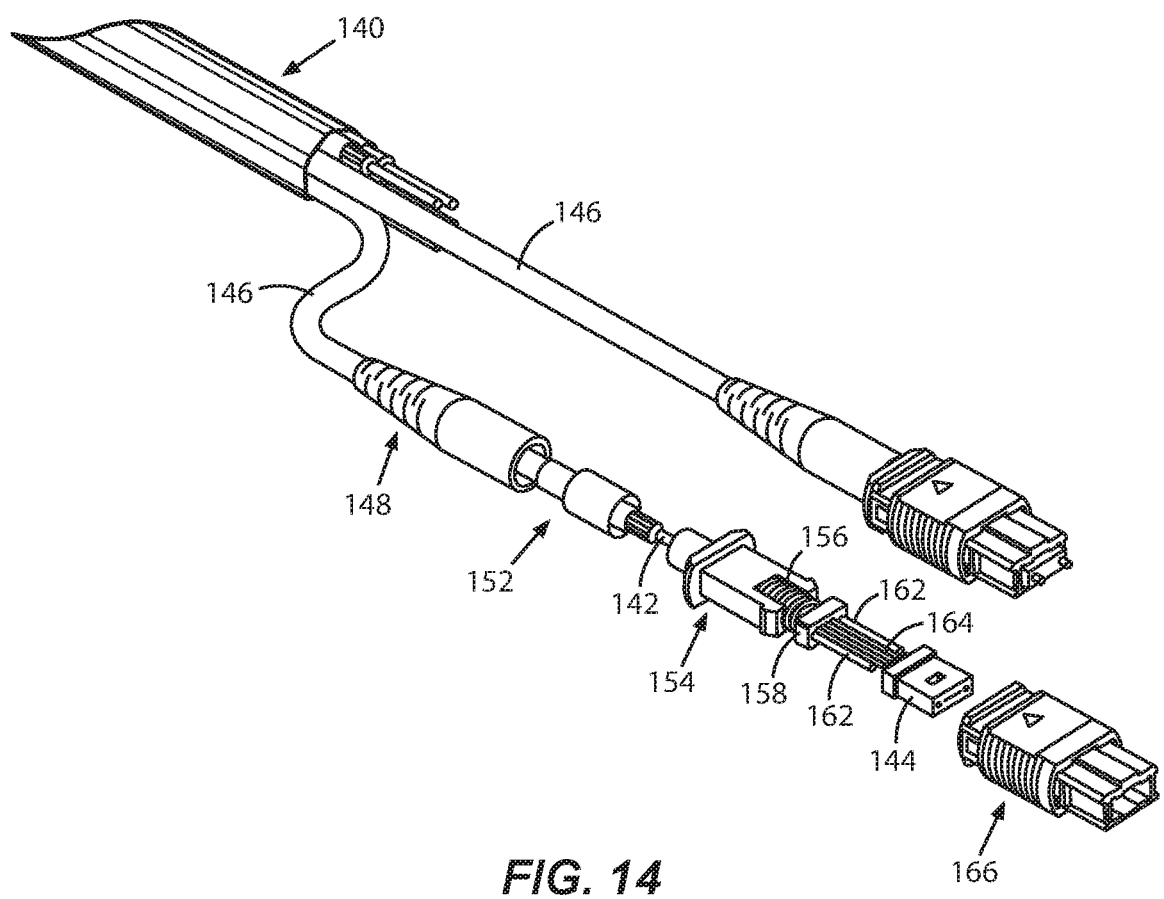
FIG. 14 is a perspective view of an optical fiber cable containing a partially bonded optical fiber ribbon in which the optical fibers within the partially bonded optical fiber ribbon are terminated into a multi-fiber ferrule, according to embodiments of the invention.

FIG. 14 is a perspective view of an optical fiber cable 140 containing a partially bonded (rollable) optical fiber ribbon 142 in which the optical fibers within the partially bonded optical fiber ribbon are terminated into a multi-fiber ferrule 144, according to embodiments of the invention. The optical fiber cable 140 includes at least one multi-fiber unit tube 146, with each multi-fiber unit tube 146 containing a partially bonded optical fiber ribbon 142.

Each multi-fiber unit tube 146 includes a crimp sleeve 152 housed around the partially bonded optical fiber ribbon 142. Each multi-fiber unit tube 146 also includes a strain-relief boot 148 that is housed around and slides up over the crimp sleeve 152. Each multi-fiber unit tube 146 also includes a spring push 154 with a spring 156 housed therein. Abutting the spring 156 is a pin clamp 158 with alignments pins 162.

According to embodiments of the invention, the partially bonded optical fiber ribbon 142 flattens out from its rolled configuration entering the spring push 154 in the multi-fiber unit tube 146 to a flat optical fiber ribbon exiting the spring push 154 (shown as flat optical fiber ribbon portion 164). The partially bonded optical fiber ribbon is terminated in the multi-fiber ferrule 144, as discussed hereinabove. A housing 166, such as an MPO housing, fits over the multi-fiber ferrule 144 and the spring push 154.

It will be apparent to those skilled in the art that many changes and substitutions can be made to the embodiments of the invention herein described without departing from the spirit and scope of the invention as defined by the appended claims and their full scope of equivalents.

The invention claimed is:

1. A connectorized optical fiber cable, comprising:
at least one multi-fiber unit tube, wherein the multi-fiber unit tube is substantially circular and dimensioned to receive a plurality of optical fibers;
at least one rollable optical fiber ribbon comprising a plurality of optical fibers positioned within the at least one multi-fiber unit tube,
wherein the multi-fiber unit tube includes a spring push that is configured in such a way that a first portion of the at least one rollable optical fiber ribbon entering the spring push is formed in a substantially circular shape and flattens out such that a second portion of the at least one rollable optical fiber ribbon exiting the spring push is formed in a substantially flat shape;
a jacket surrounding the at least one multi-fiber unit tube; and
a multi-fiber ferrule connected to an end of the second portion of the at least one rollable optical fiber ribbon, wherein the multi-fiber ferrule has a plurality of guide holes corresponding to the plurality of optical fibers in the at least one rollable optical fiber ribbon, and wherein the multi-fiber ferrule is connected to the end of the second portion of the at least one rollable optical fiber ribbon by having the ends of the optical fibers of the second portion of the at least one rollable optical fiber ribbon inserted into the guide holes.

2. The connectorized optical fiber cable as recited in claim 1, wherein the at least one rollable optical fiber ribbon comprises at least one partially bonded optical fiber ribbon.

3. The connectorized optical fiber cable as recited in claim 1, wherein the at least one rollable optical fiber ribbon comprises a plurality of optical fibers linearly arranged as a ribbon and a plurality of ribbon matrix portions applied to various portions between adjacent optical fibers within the ribbon.

4. The connectorized optical fiber cable as recited in claim 1, wherein the multi-fiber ferrule is a lensed multi-fiber ferrule.

5. The connectorized optical fiber cable as recited in claim 1, wherein the multi-fiber ferrule is a lensed multi-fiber ferrule having a stop plane therein, and wherein the end of the second portion of the at least one rollable optical fiber ribbon contacts the stop plane.

6. The connectorized optical fiber cable as recited in claim 1, wherein the multi-fiber ferrule is a lensed multi-fiber ferrule having plurality of guide holes corresponding to the plurality of optical fibers in the at least one rollable optical fiber ribbon, wherein the ends of the optical fibers of the second portion of the at least one rollable optical fiber ribbon are cleaved, and wherein the lensed multi-fiber ferrule is connected to the end of the second portion of the at least one rollable optical fiber ribbon by having the cleaved ends of the optical fibers of the second portion of the at least one rollable optical fiber ribbon inserted into the guide holes.

7. The connectorized optical fiber cable as recited in claim 1, wherein the multi-fiber ferrule has an endface, and wherein the end of the second portion of the at least one rollable optical fiber ribbon is approximately flush with the endface of the multi-fiber ferrule.

8. The connectorized optical fiber cable as recited in claim 1, wherein the multi-fiber ferrule is a lensed multi-fiber ferrule having an endface, and wherein the end of the second portion of the at least one rollable optical fiber ribbon is recessed with respect to the endface of the lensed multi-fiber ferrule.

9. The connectorized optical fiber cable as recited in claim 1, wherein the end of the second portion of the at least one rollable optical fiber ribbon is bonded within the multi-fiber ferrule.

* * * * *